US005600538A

United States Patent [19]
Xanthopoulos

[11] Patent Number: 5,600,538
[45] Date of Patent: Feb. 4, 1997

[54] PERSONAL COMPUTER AND HOUSING STRUCTURE HAVING CIRCUIT BOARD REMOVABLE HORIZONTALLY AND SUB-CHASSIS REMOVABLE FROM THE TOP THEREOF

[75] Inventor: Eric Xanthopoulos, Santa Clara, Calif.

[73] Assignee: Apple Computer, Inc., Cupertino, Calif.

[21] Appl. No.: 272,322

[22] Filed: Jul. 8, 1994

[51] Int. Cl.⁶ .................................. G06F 1/16; H05K 7/14
[52] U.S. Cl. ............................................. 361/683; 361/685
[58] Field of Search ........................... 361/686–687, 361/724–727; 364/708.1; 312/223.2

[56] References Cited

U.S. PATENT DOCUMENTS

| | | | |
|---|---|---|---|
| 4,017,129 | 4/1977 | Boldt et al. | 312/204 X |
| 4,479,198 | 10/1984 | Romano et al. | 361/683 X |
| 4,725,244 | 2/1988 | Chewning et al. | 361/683 X |
| 4,728,160 | 3/1988 | Mondor et al. | 312/236 |
| 4,964,017 | 10/1990 | Jindrick et al. | 361/683 |
| 5,121,296 | 6/1992 | Hsu | 361/685 |

FOREIGN PATENT DOCUMENTS

| | | | |
|---|---|---|---|
| 0450384 | 10/1991 | European Pat. Off. | G06F 1/16 |
| 9113197.9 | 1/1992 | Germany | G06F 1/16 |

OTHER PUBLICATIONS

Article: Macworld "Color Classic", J. A. Martin (Apr. 1993, pp. 94–98).
Article: IBM Technical Disclosure Bulletin "DASD Frame Assembly and Clamping Mechanism", vol. 32, No. 9a (Feb. 1990, pp. 68–75).
Article: IBM Technical Disclosure Bulletin "Easily Attachable Machine Cover Set", vol. 33, No. 6A (Nov. 1990, pp. 154–155).
Article: IBM Technical Disclosure Bulletin "Mechanical Packaging Scheme . . . Office Environment", vol. 33. No. 9 (Feb. 1991, pp. 379–383).

Primary Examiner—Michael W. Phillips
Attorney, Agent, or Firm—Burns, Doane, Swecker & Mathis, L.L.P.

[57] ABSTRACT

A personal computer includes a housing to which decorative panels are removably attached. The housing is formed of metal and includes a removable top for exposing an interior chamber of the housing. Removably mounted in that chamber are two independently removable sub-chassis. Each sub-chassis forms compartments and other mounting sites for receiving electrical components of the computer. The computer can be functionally reconfigured to a substantial extent by replacing or removing some of the electrical components horizontally from the housing, once the respective decorative panels have been removed. An aesthetic reconfiguring of the computer can be effected by replacing the exterior decorative panels with different decorative panels.

9 Claims, 10 Drawing Sheets

PERSONAL COMPUTER AND HOUSING STRUCTURE HAVING CIRCUIT BOARD REMOVABLE HORIZONTALLY AND SUB-CHASSIS REMOVABLE FROM THE TOP THEREOF

RELATED INVENTIONS

The invention disclosed herein is related to the inventions described in my concurrently filed Application Ser. Nos. 08/271,959, now U.S. Pat. No. 5,469,692 and 08/271,958, and the disclosures thereof are incorporated by reference herein.

BACKGROUND OF THE INVENTION

The present invention relates to personal computers and, in particular, to the housing structure thereof.

Personal computers (p.c.) typically comprise a housing in which are mounted the various functional components of the computer. The housing usually comprises wall components which form not only the outer shell of the computer but also the internal bays, pockets, compartments, etc. in which the functional components are mounted.

It will be appreciated that once such a computer has been manufactured, the ability to easily reconfigure the computer from the standpoint of its appearance and/or functionality is greatly limited. Some reconfiguration of the functionality has been made possible by providing computers with plug-in modules but the amount of reconfiguring that can be achieved thereby is relatively minimal. In effect, the only way to perform a substantial reconfiguring of computer functionality or appearance is to essentially disassemble the computer, which is prohibitively expensive from the standpoint of time and cost. This means that once a computer is manufactured, it may not be easily reconfigured to incorporate recent innovations, or alter its capabilities, or change its appearance.

One way of avoiding that shortcoming while still offering customers with a wide variety of quickly-available computers requires that computer manufacturers maintain a relatively large inventory of computers. However, that practice is relatively costly from economic and storage space standpoints.

SUMMARY OF THE INVENTION

The present invention relates to a personal computer comprising a housing and electrical components horizontally removable from the housing. The housing includes horizontally removable walls providing horizontal access to the horizontally removable electrical components.

Preferably, the horizontally removable electrical components include a hard drive horizontally removable from a front side of the housing, and a logic board assembly horizontally removable from a rear side of the housing.

The housing includes a metal portion having metal vertical walls forming openings which the horizontally removable electrical components are horizontally removable. The housing further includes exterior panels which define the horizontally removable walls.

The exterior panels preferably carry coupling elements which are connectable to metal walls of the metal portion of the housing.

The present invention further relates to a personal computer, comprising a metallic housing which includes a plurality of walls defining an enclosed chamber. At least one sub-chassis is disposed within the chamber. One of the walls is movable to a chamber-exposing state to enable the sub-chassis to be inserted and removed. External panels are removably mounted on at least some of the walls.

The computer preferably includes a front wall, a 10 rear wall, two side walls, a bottom wall, and a top wall, with the panels being removably mounted on at least the front wall, the side walls and top wall.

Preferably, there are two sub-chassis independently insertable and removable relative to the chamber. The top wall preferably includes a pair of downwardly projecting side flanges extending to the outside of the side walls of the housing. Lower edges of the flanges include lugs defining horizontal slits. Upper edges of the side walls of the base include outwardly projecting ears. Portions of the ears are receivable in the slits in response to horizontal movement of the top wall relative to the side walls.

The present invention also relates to a personal computer comprising a housing which includes a metallic base having a plurality of walls defining an enclosed chamber. First and second sub-chassis are disposed within the chamber. One of the walls comprises a top wall movable to a chamber-exposing state to enable the first and second sub-chassis to be independently inserted and removed vertically.

The present invention further relates to a personal computer comprising a housing which includes a plurality of metallic walls defining an enclosed chamber. One of the walls is movable to a chamber-exposing state. External panels are removably mounted on at least some of the walls.

The present invention further relates to a personal computer comprising a housing including a plurality of metallic walls which define an enclosed chamber. The walls include a front wall, a rear wall, two side walls, a top wall, and a bottom wall. The top wall is removably attached to the side walls and includes a pair of downwardly projecting side flanges extending to the outside of the side walls. Lower edges of the side flanges include lugs which define horizontal slits. Upper edges of the side walls include outwardly projecting ears. Portions of the ears are receivable in the slits in response to horizontal movement of the top wall relative to the side walls.

BRIEF DESCRIPTION OF THE DRAWINGS

The objects and advantages of the invention will become apparent from the following detailed description of a preferred embodiment thereof in connection with the accompanying drawings, in which like numerals designate like elements and in which.

DETAILED DESCRIPTION OF THE PREFERRED EMBODIMENT OF THE INVENTION

Figure 1:
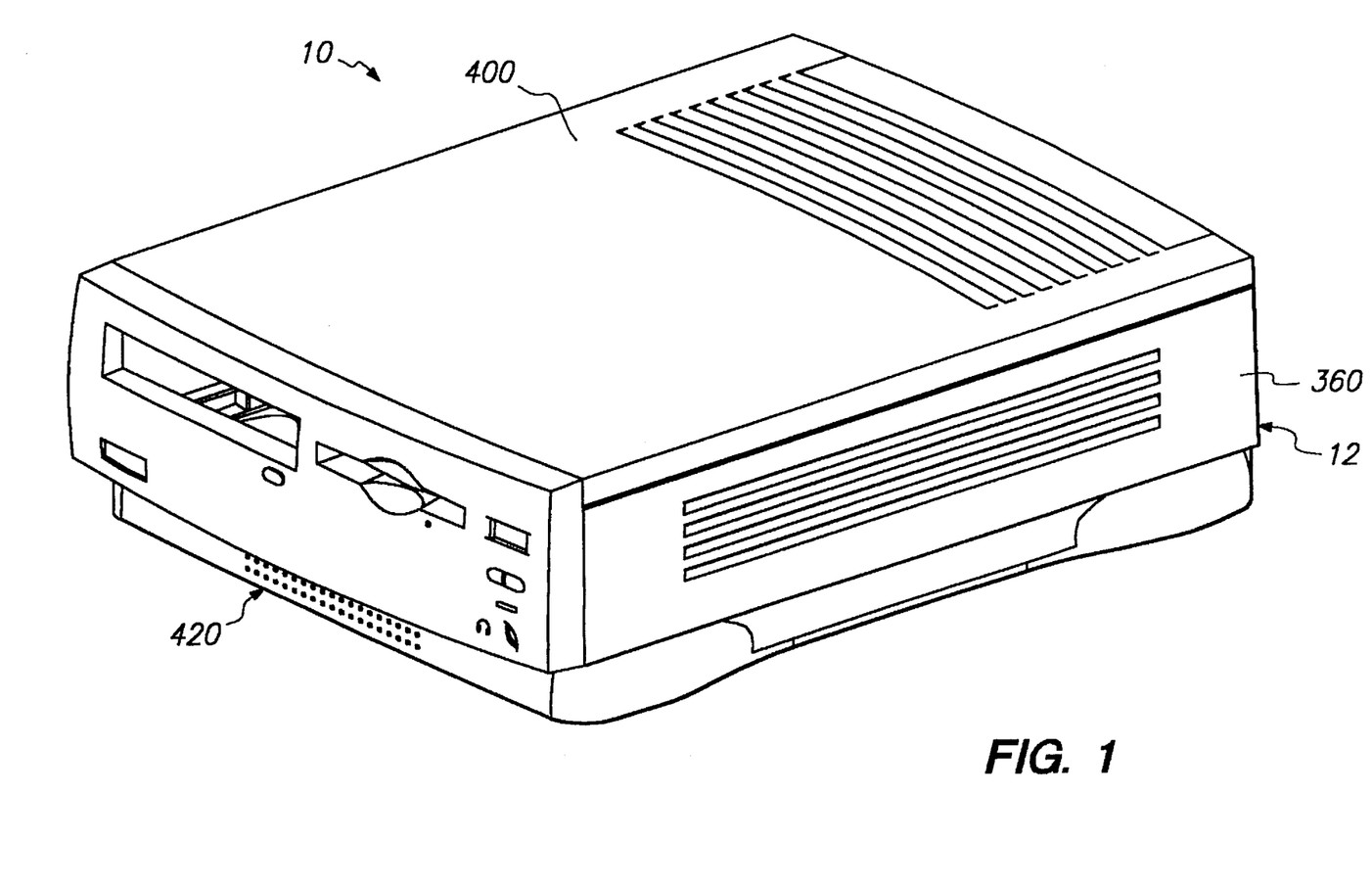
FIG. 1 is a front top perspective view of a personal computer according to the present invention, in a fully assembled state.

Depicted in FIG. 1 is a personal computer 10 according to the present invention in an assembled state. The computer comprises a metallic housing 8 (FIG. 7) encompassed by replaceable exterior (decorative) panels 12 (FIG. 8). The housing, which will be described in connection with remaining ones of the figures, comprises a base chassis 14 and separately insertable/removable sub-chassis 124, 200 to facilitate subsequent reconfiguring of the computer functionality by being easily replaced, as will become apparent from the following description. Also, the presence of replaceable exterior panels 12 makes it possible to easily reconfigure the computer appearance.

The housing 8 comprises the base chassis 14 (see FIG. 2) which serves as the main carrier for all components of the p.c. 10. The base 14, which is formed of sheet metal, such as aluminum, is bent to form a bottom wall 16, a pair of upstanding side walls 18, 20, an upstanding front wall 22, and an upstanding rear wall 24. Front edges of the side walls 18, 20 include flaps 26, 28, respectively, which are bent around the front surface 30 of the front wall 22. Horizontal ends of the front wall 22 form horizontal projections 32 (only one depicted) which fit into respective recesses 34, each recess 34 being situated at a corner formed by a respective side wall/flap arrangement.

Figure 12:
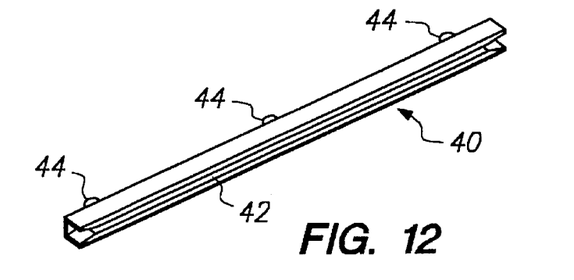
FIG. 12 is a perspective view of a removable rail attachable to the base.
Figure 13:
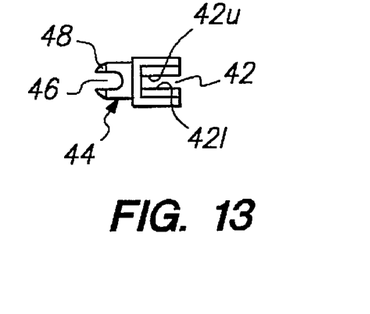
FIG. 13 is an end view of the rail depicted in FIG. 12.

Disposed adjacent a lower edge of the side wall 20 is a plurality of (e.g., three) horizontally spaced holes, each of which is formed in the center of a semi-spherical inward bulge 38 of the side wall 20. Those holes are arranged to receive a snap-in track 40 (see also FIGS. 12 and 13). The track 40, which can be of molded plastic, includes a horizontal slot 42 formed by upper and lower surfaces 42U, 42L the ends of which diverge from one another. A plurality of cylindrical mounting protrusions 44 is formed on a side of the track situated opposite the slot 42. Each protrusion 44 is bifurcated by a groove 46 (see FIG. 13) and its free end 48 is bevelled. By snapping the protrusions 44 into respective ones of the holes 36 of the side wall 20, the track 40 can be mounted in place.

A power supply assembly 50 is insertable downwardly into the base 14 (see also FIGS. 9 and 10). that assembly, which contains conventional power supply equipment, includes a plurality of vertical walls 51a–51d. One of the walls carries a tab 52 having a hole therein to enable the power supply assembly 50 to be secured to a hole 53 formed in the bottom wall 16 by a fastener such as a screw.

Figures 9, 10:
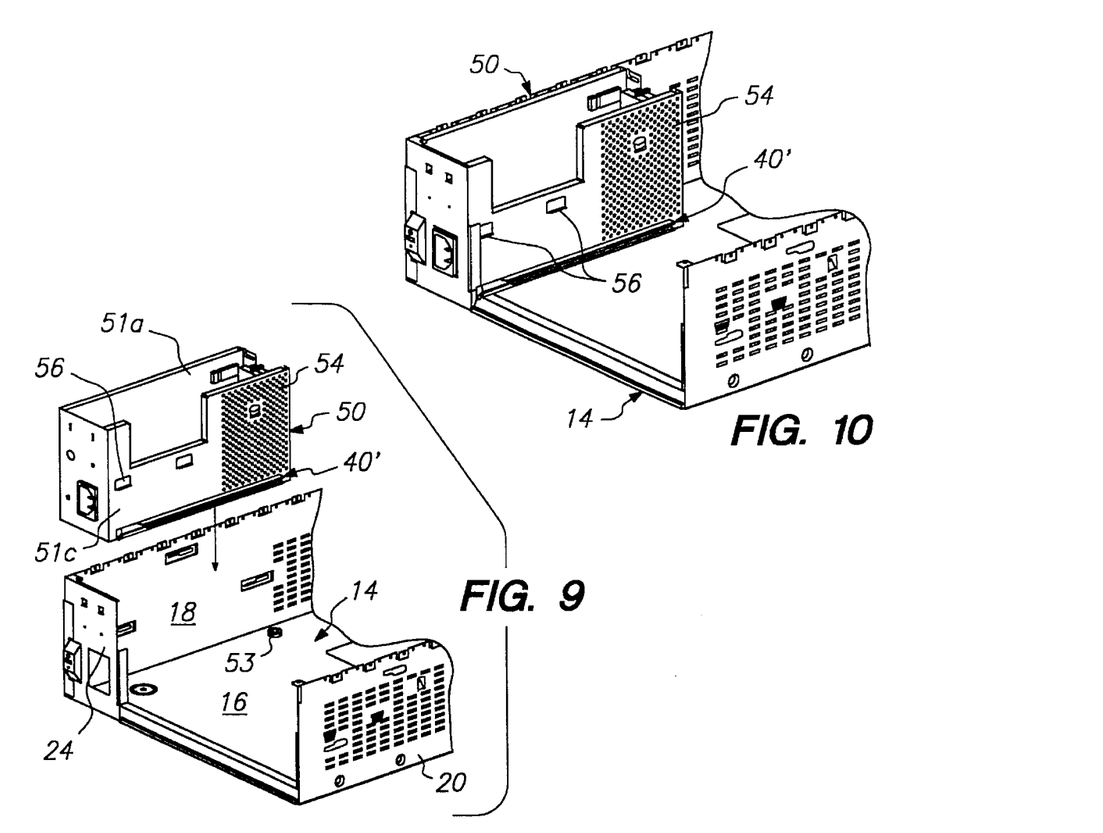
FIG. 9 is a fragmentary top rear perspective view of the base depicting the installation of a power supply assembly into the base as in FIG. 2.
FIG. 10 is a view similar to FIG. 9 following the installation of the power supply assembly.

As depicted in FIGS. 9 and 10, the wall 51c includes air flow holes 54 and a pair of vertically open slots 56 for reasons to be explained later. The wall 51d also includes track-mounting holes (not shown) in which a second track 40' is mounted at the same elevation as the first track 40.

A main logic board assembly 60 (see FIG. 2) is insertable as a unit into the base 14. That assembly 60 includes a horizontal base board 62, side edges 64, 64' of which are slid horizontally into the slots 42 of the tracks 40 (see FIG. 9), 40'. The rear wall 24 of the base extends only partially across the rear of the base 14 to enable the main logic board assembly 60 to be horizontally installed through the rear of the base. The base board 62 carries a plurality of additional circuit boards 66 in any desired arrangement. A multi-pin connector 68 (e.g., an MLB FOXCONN connector) is mounted to an inner edge of the main logic board assembly 60.

Also installed downwardly into the base 14 is a speaker assembly 70. That speaker assembly 70 includes an end plate 72, the vertical edges of which slide vertically downwardly into spaces defined by two hooks 74 (both hooks 74 shown in FIG. 2). Each hook is formed by a partially cut portion of the side wall 20 which has been bent inwardly. The speaker assembly could also contain a downward projecting post (not shown) which fits into a hole 75 formed in the bottom wall 16 of the base 14 (see FIG. 2).

Figure 3:
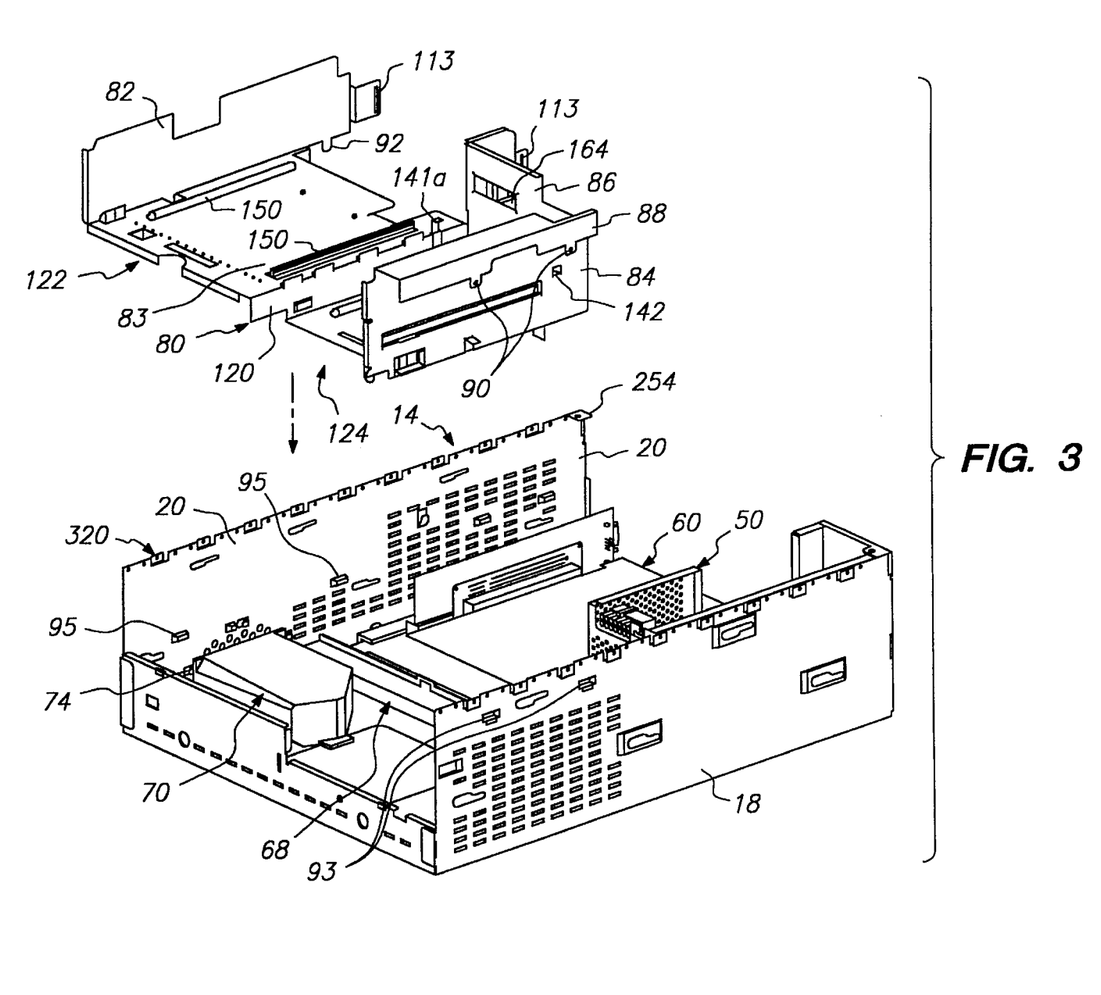
FIG. 3 is a view similar to FIG. 2 as a front sub-chassis is being installed into the base.
Figure 4:
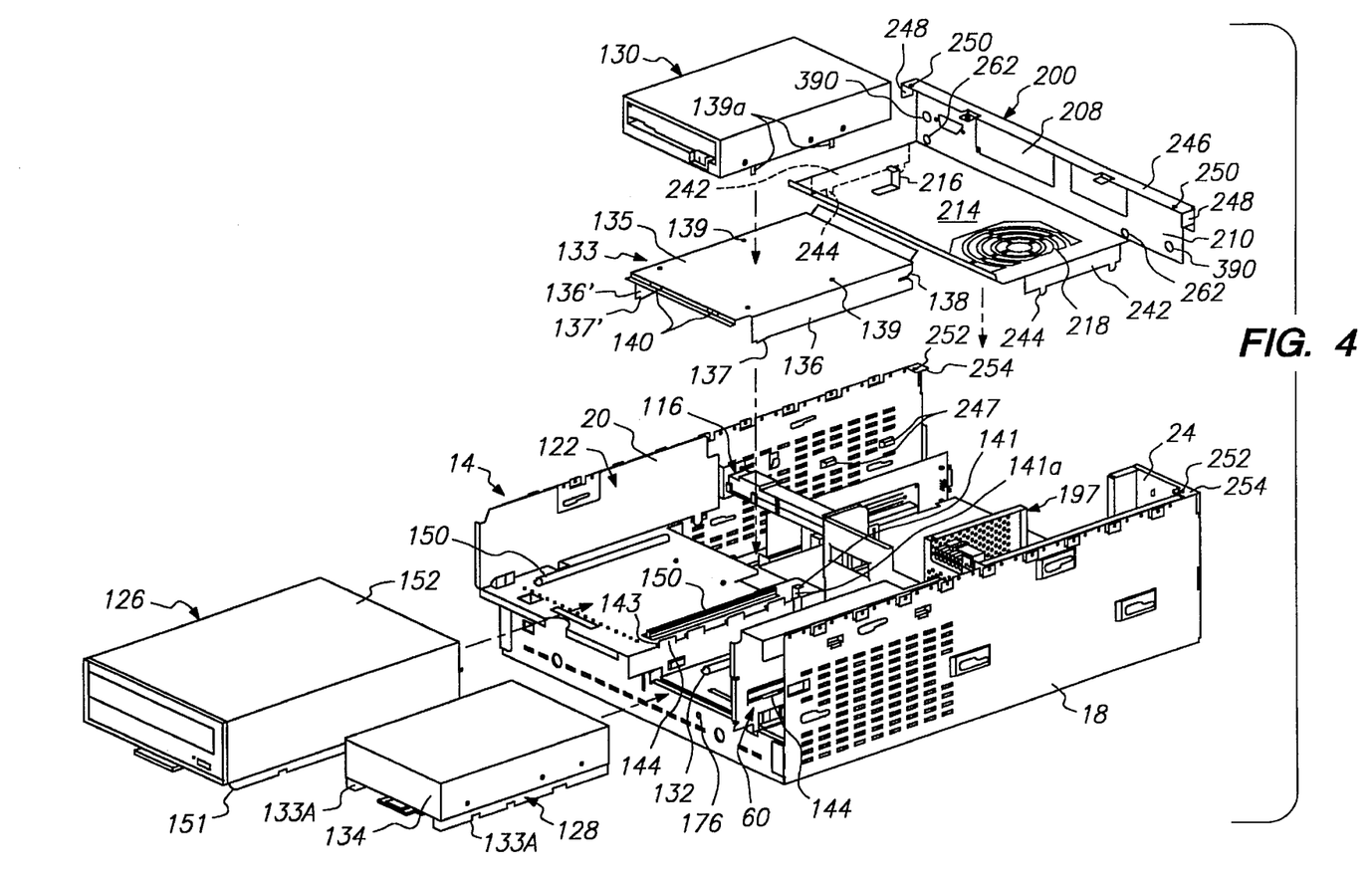
FIG. 4 is a view similar to FIG. 3 depicting hard and floppy drives, and a CD drive being inserted into the front sub-chassis, and a rear sub-chassis being downwardly inserted into the base.

A front sub-chassis 80 is installable vertically downwardly into the base 14 (see FIG. 3). The front sub-chassis 80 can be formed of any suitable material, e.g., plastic and metal, but preferably is formed of bent sheet metal. That front sub-chassis 80 comprises a bottom wall 83, a pair of upstanding side walls 82, 84, and an upstanding rear wall 86 (see FIGS. 3 and 11). An upper edge of one of the side walls 84 is folded over about a pair of fold lines to form a vertical outer flange 88 having two downwardly projecting tabs 90. The other side wall 82 has a pair of tabs 92 projecting downwardly from its lower edge. When the front sub-chassis 80 is inserted downwardly into the base 14, the tabs 90 are inserted into vertically open slots 93 formed by bent portions of the side wall 18, and the tabs 92 are inserted into similar vertically open slots 95 formed by bent portions of the side wall 20. Each of those slots is formed by making a pair of horizontal, parallel cuts in the sheet metal, and pushing-in the portions of the sheet metal formed between the two cuts. It will be appreciated that once installed as shown in FIG. 4, the front sub-chassis 80 will be effectively constrained against movement in all directions except upwardly.

Projecting downwardly from a rear edge of the bottom wall 83 is a leg 94 (see FIG. 11) which engages the bottom wall 16 of the base to support the rear portion of the front sub-chassis 80.

Also projecting downwardly from the rear portion of the front sub-chassis 80 are two legs 98, 100 (FIG. 11) each of which has a vertical slot 102 formed therein. Those slots 102 receive end tabs 103 of the connector 68. The connector 68 could be connected to the front sub-chassis 80 before being connected to the logic board assembly. Then, the logic board assembly could simply be plugged into that connector. That is, the legs 98, 100 can be elastically flexed away from one another to enable the legs to be inserted downwardly past opposite ends of the connector 68. Upon being released, the legs 98, 100 will snap back to enable the end tabs 103 of the connector to enter the slots 102.

Figure 2:
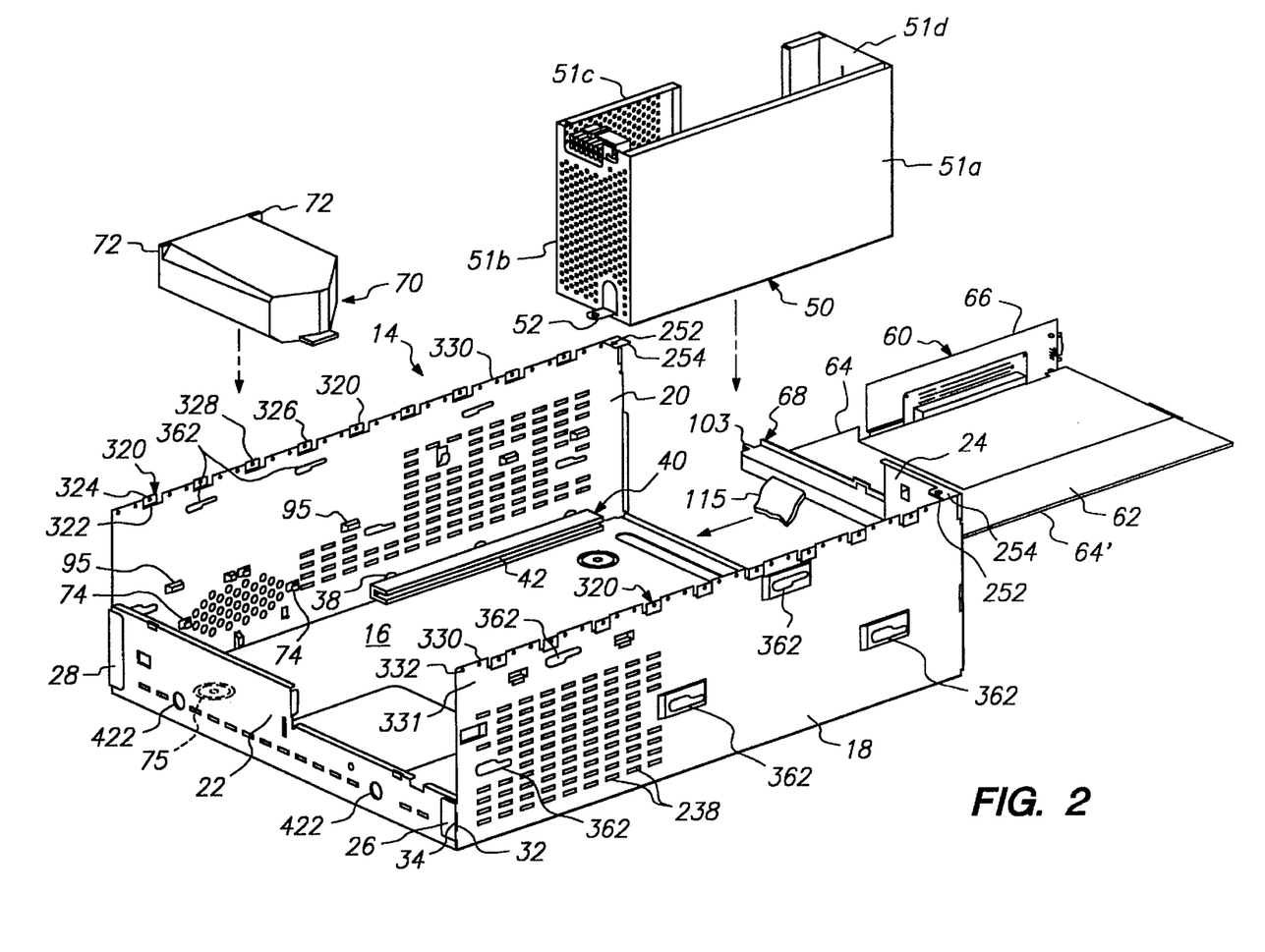
FIG. 2 is a top perspective view of a base portion of the computer housing as a speaker assembly, a power supply assembly, and a logic board assembly are being installed therein.

Projecting rearwardly from rear wall 86 is a flange 110 which includes a slotted bracket 112. The slot 113 in the bracket 112 is horizontally aligned with a slot formed in another bracket 114 which projects rearwardly from the side wall 82. This enables a connector 116 (see FIG. 4), such as a CD FOXCONN connector, to be mounted in the slotted brackets 112, 114 in similar fashion to the connector 68. It will be appreciated that the connectors 68, 116 include flat (ribbon) cables 115 only one of which is shown in FIG. 2.

Figure 5:
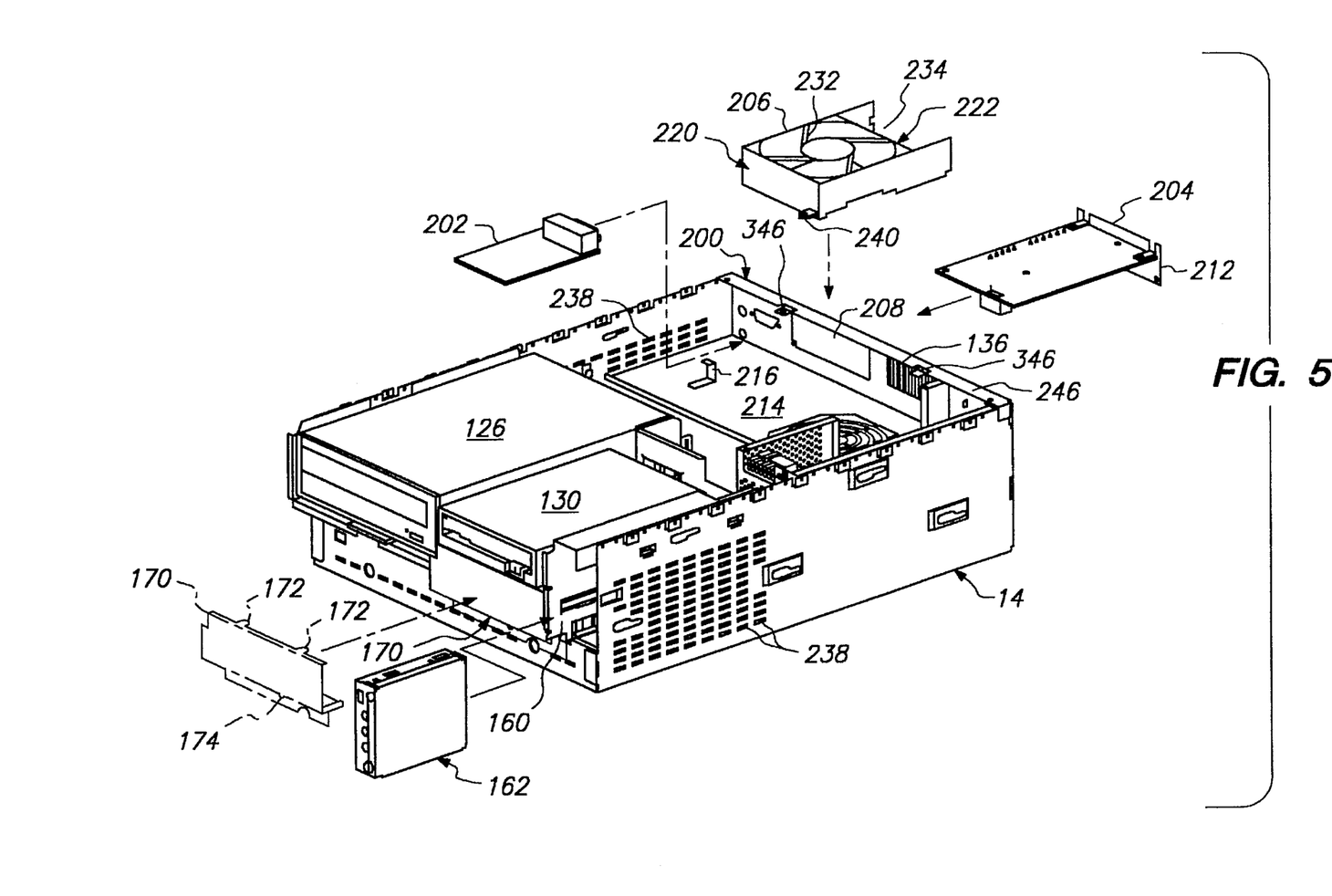
FIG. 5 is a view similar to FIG. 4 depicting functional components being inserted into the rear sub-chassis, and a head phone board assembly being inserted to the front of the base.
Figure 11:
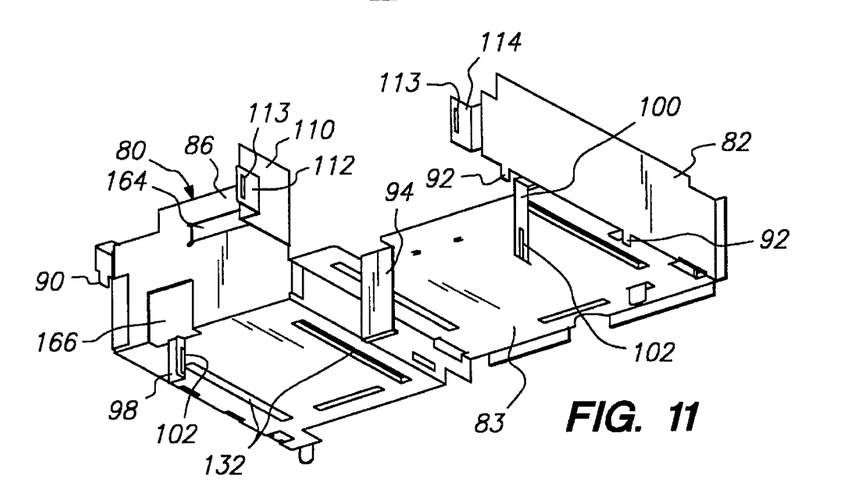
FIG. 11 is a bottom rear perspective view of the front sub-chassis.

The bottom wall 83 is stepped at 120 to form side-by-side mounting compartments or bays 122, 124 (see FIG. 3) for receiving functional components of the computer. For example, as shown in FIG. 5, the bay 122 can receive a CD assembly 126 (which plugs into the connector 116), and the bay 124 can receive a hard disc drive 128 (and a floppy disk drive 130 as will be explained later). The bottom wall 83 forming the bay 124 includes connecting elements in the form of two upstanding rails 132 formed by partial cut-outs which have been bent along front-to-rear extending fold lines to form an inverted L-shape. (FIG. 4 shows one rail 132 from above; FIG. 11 shows both rails 132 from below.) The rails 132 are open in directions away from one another. The underside of the hard disc drive housing 134 includes a pair of similar rails 133A (of L-shape) which are bent in directions opposite from the rails 132, i.e., the rails of hard disc drive housing 134 are open in directions extending toward one another. Thus, when the hard disc drive housing 134 is slid into the bay 124, its rails engage the rails 132 of the bay 124.

A floppy drive carrier 133 is provided in the form of a plate 135 having a pair of downwardly bent side flanges 136, 136'. Each side flange includes a downwardly projecting lug 137, 137' at its front end and a rearwardly open slot 138 at its rear end. A plurality (e.g., four) holes 139 are formed in the plate 135, and a pair of slits 140 are formed in a front edge of the plate 135.

The bottom wall 83 includes an upwardly projecting arm 141A, the upper end 141 of which is bent horizontally (see FIGS. 3 and 4). That arm 141A is situated at the step 120 between the bays 122, 124. Situated opposite the horizontal upper end 141 of the arm 141A is a horizontal finger 142 which is formed by an inwardly bent cut-out of the side wall 24 (see FIG. 3). The horizontal upper end 141 of the arm 141A is coplanar with the finger 142, and both are arranged at an elevation such that when the floppy carrier 133 is inserted downwardly, the slots 138 formed in flanges 136, 136' will be horizontally aligned with the horizontal end 141, and the finger 142, respectively and will receive same in response to rearward movement of the floppy carrier. Then, the front end of the floppy carrier 133 can be moved downwardly so that the lug 137' of the flange 136' enters a recess 143 formed by a bent-up tab 144 of the bottom wall 16, and the lug 137 of the other flange 136 enters a recess 144 formed in the side wall 84 of the front sub-chassis 80. Consequently, the floppy carrier 133 is locked against horizontal movement.

The bottom of the housing of the floppy drive 130 includes downwardly projecting posts 139A arranged to enter the holes 139 formed in the top plate 135 of the floppy carrier 133, thereby enabling the floppy carrier 133 to be installed in response to downward motion.

The bay 122 includes connecting elements in the form of a pair of upstanding rails 150 (inverted L-shape) which cooperate with rails 151 (L-shape) formed on the bottom of the CD drive housing 152. This enables the CD drive 126 to be slid horizontally into the bay 122.

The folded-over upper edge of the side wall 84 serves to space the front sub-chassis 80 from the side wall 18 of the base 14 in order to form a pocket 160 for the reception of an electrical component such as, for example, an IR/PB headphone board assembly 162 (see FIG. 5).

The front sub-chassis 80 includes various apertures 164, 166 to accommodate the passage of various electrical conductors, cables, etc., being used.

After the hard drive 128 and the floppy carrier 133 have been installed, a locking bracket 170 is connected to the front wall 22 of the base 14 (see FIG. 5). That locking bracket 170 includes a pair of tabs 172 arranged to enter respective ones of the slits 140 formed in the front edge of the floppy carrier 133, and a hole 174 arranged to be aligned with a hole 176 (see FIG. 4) formed in the front wall 22 of the base for receiving a fastener such as a screw. With the locking bracket installed, removal of the hard drive 128 in the forward direction is prevented.

Installable in a rear portion of the base 14 is a rear sub-chassis 200 for supporting operational components such as, for example, a video output board 202, a TV tuner board assembly 204, and a cooling fan assembly 206 (see FIGS. 4 and 5). The rear sub-chassis can be formed of any suitable material, such as plastic and metal, but bent sheet metal is preferred. The video output board 202 can be mounted to the rear sub-chassis 200 in any suitable manner, e.g., by screws. The TV tuner assembly 204 is inserted horizontally through a window 208 formed in a back wall 210 of the rear sub-chassis 200, and includes a back plate 212 for closing the window. Suitable fasteners such as screws can be used to connect the TV tuner assembly 204 to the rear sub-chassis 200. The rear sub-chassis 200 includes a horizontal table 214 having a connecting element in the form of an upstanding leg 216 upon which one side of the TV tuner assembly may rest. A fastener such as a screw may be inserted through the TV tuner assembly 204 and a top horizontal portion of the leg 216 for securing the TV tuner assembly thereto.

Figure 14:
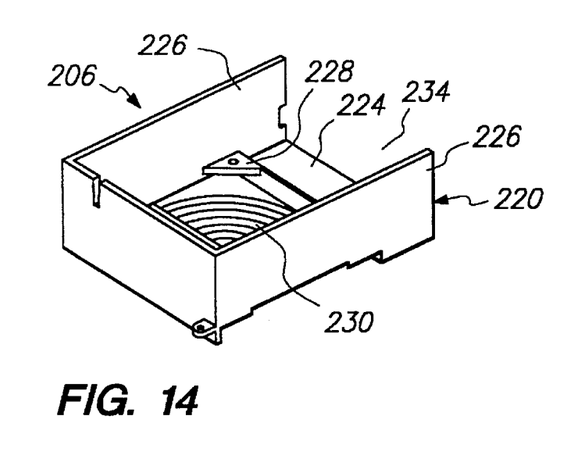
FIG. 14 is a top perspective view of a housing for a fan.

The cooling fan assembly 206 is mounted upon a portion of the table which has a pattern of air-flow openings 218 formed therein. The fan assembly 206 includes a housing 220 in which is mounted a motor-driven fan 222. The housing 220 is depicted in detail in FIG. 14. That housing 220 includes a floor 224 and upstanding side walls 226. A fan-support wall 228 extends upwardly from the floor 224 so that the motor-driven fan 222 can be rested thereon and secured by suitable fasteners such as screws. The floor 224 includes a pattern of air flow openings 230 which correspond in configuration to the air flow openings 218 formed in the table 214 of the rear chassis 200. The fan 222 includes fan blades 232 and a motor (not shown) connected therebeneath to rotate the fan blades. The rear end of the fan housing 220 is open at 234 and is aligned with air flow openings 236 formed in the back wall 210 of the rear sub-chassis 200. Thus, when the fan blades 232 are rotated, a cooling air flow is established upwardly through the air flow openings 218, 230 and then rearwardly through the openings 236. The side walls 18, 20 of the base 14 are provided with air flow apertures 238 to facilitate an air flow through the interior of the base 14.

The fan assembly 206 can be mounted to the rear sub-chassis 200 in any suitable manner. An apertured tab 240 is provided at the front of the fan housing 220 which can be seated on, and attached to, a connecting element in the form of an upstanding leg of the table 214 by a fastener such as a screw, similar to the earlier-described leg 216.

Prior to the installation of the rear sub-chassis 200 into the base 14, the components to be carried thereby, e.g., the video output board 202, the TV tuner board 204, and the fan assembly 206, can be mounted in place and thus are installed as a unit with the rear sub-chassis 200.

The rear sub-chassis 200 includes a pair of side flanges 242 each of which possesses two downward tabs 244. Those tabs fit into the vertically open slots 56 formed in the wall 51c of the power supply assembly 50 (see FIG. 10).

Extending along the upper edge of the back wall 210 of the rear sub-chassis 200 is a horizontal flange 246 having a downwardly depending ear 248 at each end thereof. The flange 246 is adapted to rest upon the top edges of the rear and side walls 24, 18, 20 of the base 14 when the rear sub-chassis 200 is inserted downwardly into the base. The ears 248 are positioned to lie to the outside of respective ones of the base side walls 18, 20; the back wall 210 of the rear sub-chassis 200 will be situated behind the base rear wall 24. Therefore, the rear sub-chassis will be effectively locked against horizontal shifting. If desired, fasteners such as screws could be inserted through aligned holes 250, 252 formed in the flange 246 and in horizontal ears 254 of the base side walls 18, 20.

Figure 6:
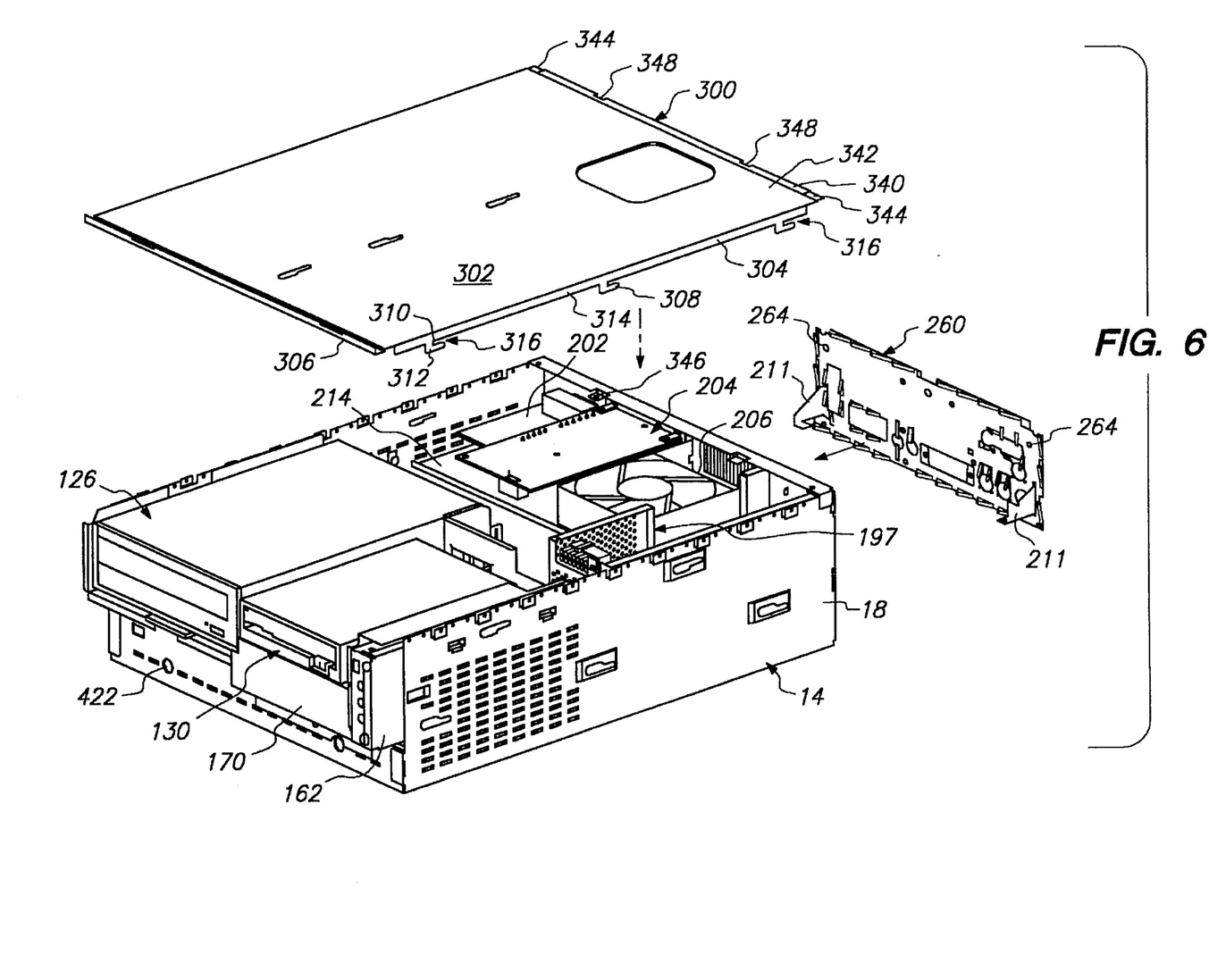
FIG. 6 is a view similar to FIG. 5 depicting a top cover wall being inserted downwardly onto the base, and a fence plate being inserted onto the rear of the base.

The vertical height of the back wall 210 of the rear sub-chassis 200 is less than that of the base rear wall 24, which means that a space will be formed below the lower edge of the back wall 210 in a region offset from the base rear wall 24. In order to close that space and provide proper EMI/RFI shielding, there is provided a metal fence plate 260 (see FIG. 6). The fence plate 260 includes two arms 211 which receive fasteners such as screws for connecting the fence plate 260 to the logic board assembly 60. The fence plate 260 can be connected to the housing in any suitable fashion, such as by fasteners (e.g., screws) passing through aligned holes 262, 264 in the back wall 210 and fence plate 260, respectively. The fence plate 260 and base rear wall 24 include apertures for accommodating the passage of wires, cables, and other electrical conductors connected to the P.C. components.

In order to secure the internal components of the P.C. inside of the base 14, and to complete the EMI/RFI shielding, a top cover 300 is provided (see FIG. 6) which defines a movable top cover of the housing 8. The top cover 300, which is formed of bent sheet metal, includes a horizontal portion 302, a pair of downwardly bent side flanges 304 (only one shown in FIG. 6), and an upwardly bent front flange 306. Each of the side flanges 304 includes a row of horizontally spaced L-shaped lugs 308 (see FIGS. 6 and 15). Each lug 308 includes a vertical portion 310 and a horizontal portion 312. Formed between each horizontal portion 312 and a lower edge 314 of an associated side flange 304 is a horizontal slit 316. The lugs 308 are arranged for connection with ears 320 formed along the upper edges of the base side walls 18, 20. Each ear is formed by making parallel vertical cuts in the side wall, and bending outwardly the portion of the side wall lying between the cuts. An end of that bent portion is further bent upwardly. Therefore, each ear 320 includes a horizontal portion 322 extending outwardly from the side wall, and a vertical portion 324 extending upwardly from an outer end of the horizontal portion 322. An inwardly facing surface 326 of each vertical portion 324 includes a laterally inwardly projecting bump 328 formed by dimpling an outer surface of the vertical portion 324. Likewise, the portions 330 of the side walls disposed between successive ears 320 have outer surfaces which contain outwardly projecting bumps 332. Since the lugs 308 become situated outside of the side walls 18, 20 of the base, an effective EMI/RFI shielding is created.

A rear edge of the cover 300 is defined by a horizontal rear flange 340 which is stepped downwardly with respect to an upper surface 342 of the cover. That rear flange 340 is adapted to be inserted between the horizontal flange 246 of the rear sub-chassis 200 and the ears 254 of the base side walls 18, 30. The rear flange 340 includes holes 344 which become aligned with the holes 250, 252 of the flange 246 and ears 254, respectively, to receive fasteners such as screws.

Figure 15:
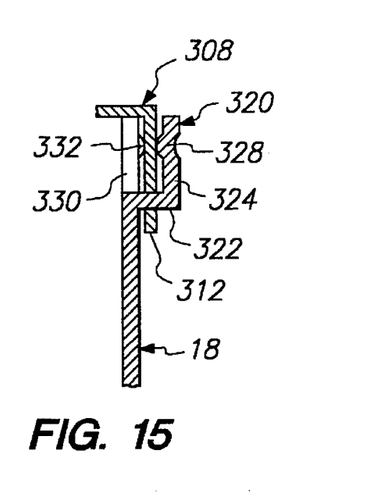
FIG. 15 is a sectional view taken along the line 15—15 in FIG. 7.

The rear flange 340 also comes to rest upon a pair of fingers 346 (see FIG. 5) formed integrally with the flange 246 of the rear sub-chassis 200, and includes two recesses 348 which engage those fingers 346 when the top cover is pushed horizontally rearwardly in a manner causing the lugs 308 to engage the ears 320 (see FIG. 15).

Figure 7:
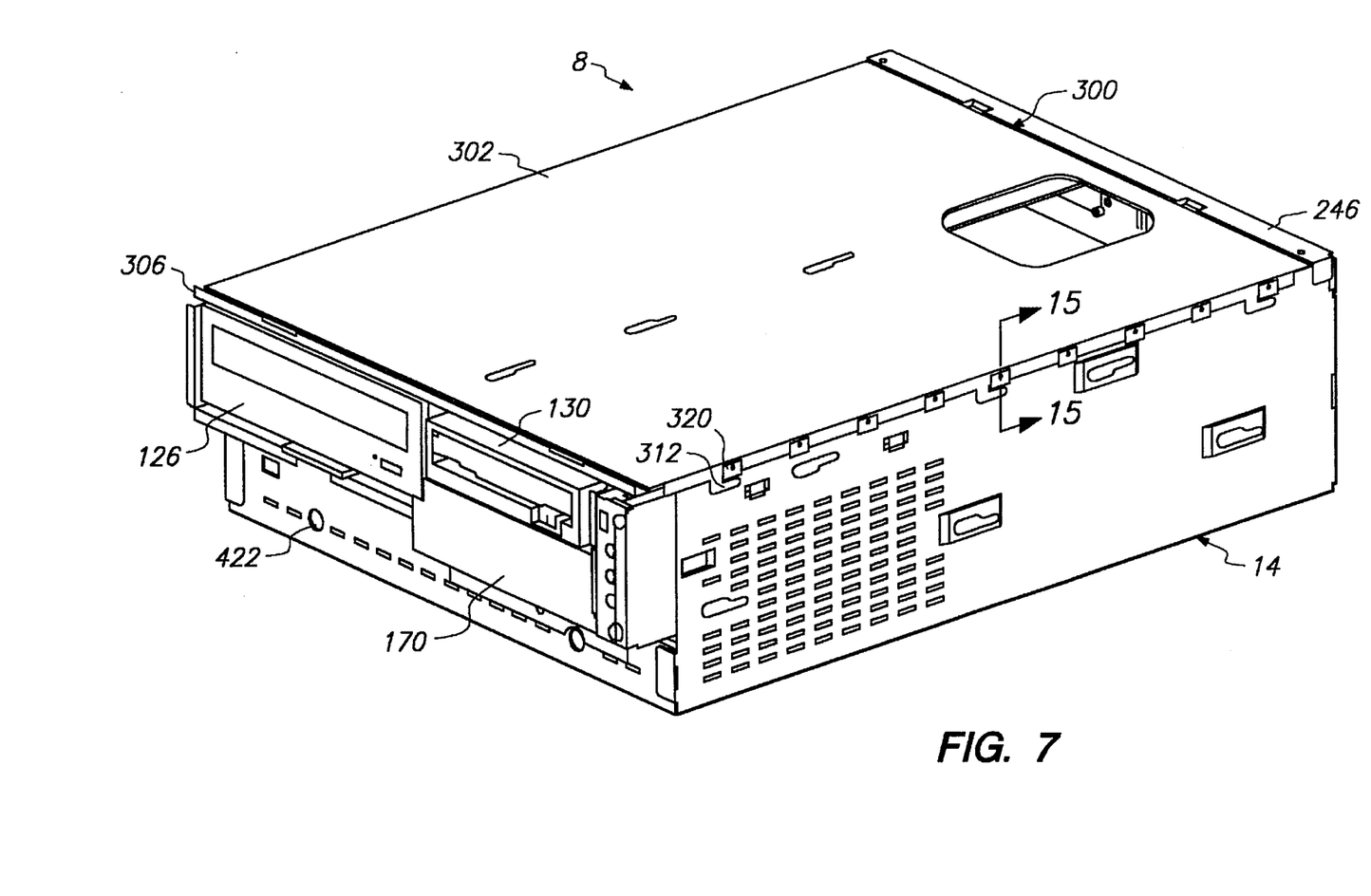
FIG. 7 is a view of the computer similar to FIG. 6 following the installation of the top cover wall.
Figure 8:
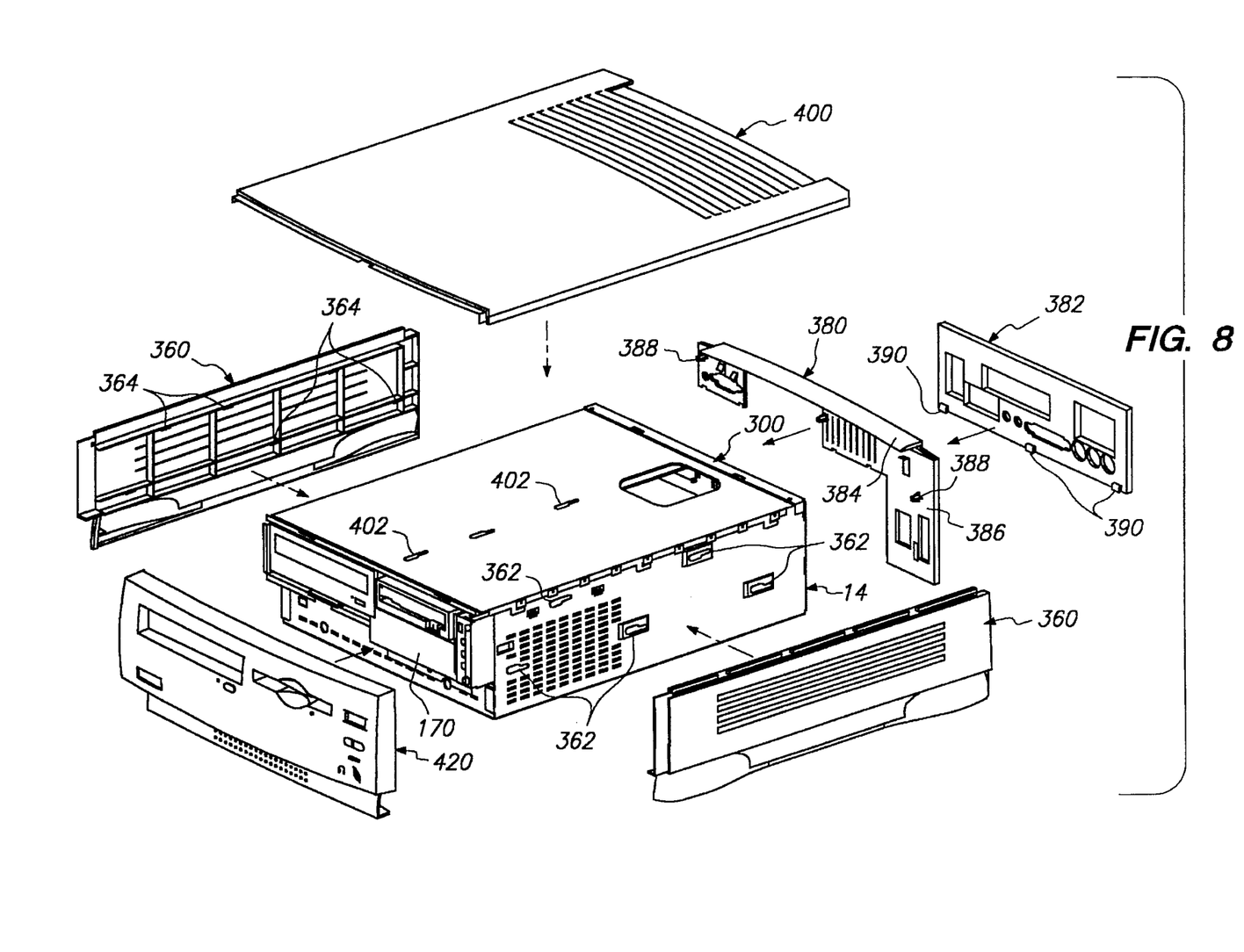
FIG. 8 is a view similar to FIG. 7 depicting a decorative panel being inserted onto the housing.

In FIG. 7, the structural parts of the housing of the p.c. are shown as fully assembled. The p.c. is then completed by installing exterior decorative panels 360, 380, 382, 400, 420, i.e., a decorative shell, around the housing. Those panels can be formed of any suitable material, such as plastic, wood, metal, etc. and can be of any desired decorative appearance.

Figure 16:
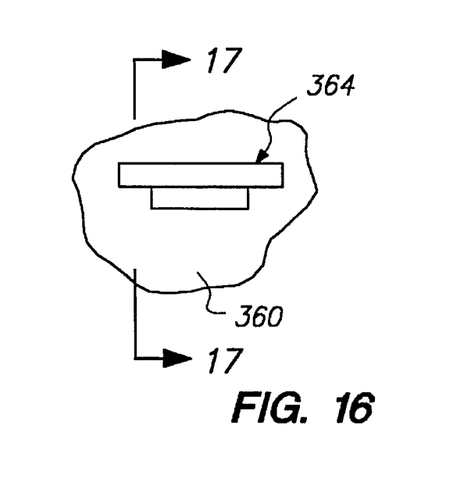
FIG. 16 is a front view of a finger projecting from a decorative panel according to the present invention.
Figure 17:
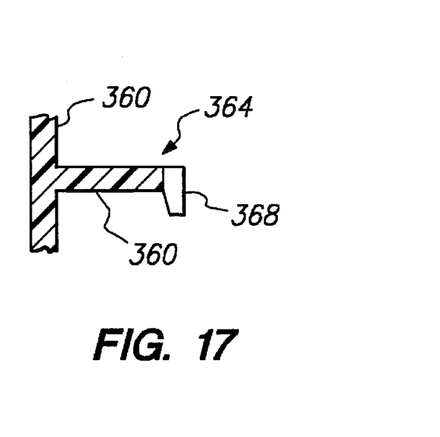
FIG. 17 is a sectional view taken along the line 17—17 in FIG. 16.

Depicted in FIG. 8 are decorative side panels 360. To facilitate the mounting of the side panels, the side walls 18, 20 of the computer base 14 include a plurality of horizontal through-slots 362 each of which is narrow at one end and wide at the other end. The side panels carry mounting fingers 364 which are configured to make connection with the through slots (see FIGS. 16, 17). The mounting fingers 364 are generally hook shaped in that each finger includes a horizontal portion 366 projecting horizontally from the panel body. Each horizontal portion 366 terminates in a downwardly projecting portion 368. The fingers 364 are able to be inserted laterally inwardly into the wide ends of the respective through-slots and then slide into the narrow ends as the panel is slid horizontally. The fingers 364 cannot be removed laterally outwardly from the narrow ends of the slots.

The rear end of the p.c. is completed by the attachment of a rear panel 380 and door 382 (see FIG. 8). The rear panel is generally L-shaped, in that it includes a horizontal section 384 and a vertical section 386 depending downwardly from one end of the horizontal section 384. The rear panel 380 includes projections 388 which make a press fit with holes 390 formed in the back wall 210 of the rear sub-chassis 200 (see FIG. 4).

The door 382 includes bottom tabs 390 which fit into corresponding slots in the fence 260. The door 382 is installed prior to the rear panel 380 so that the upper edge of the door is secured by the horizontal portion 384 of the rear panel 380.

The top of the p.c. is completed by the mounting of a decorative top panel 400 (see FIG. 8). The top panel 400 includes a plurality of hook-shaped fingers (not shown, but similar to the fingers 364) which fit into through-slots 402 formed in the top cover 300. The through-slots 402 are shaped similar to the earlier-described through-slots 362.

Following the installation of the top panel 400, a front panel or bezel 420 (FIG. 8) is installed. That bezel includes conical projections (not shown) which make a press (friction) fit with holes 422 formed in the front wall 22 of the base 14. The resulting p.c. structure is depicted in FIG. 1.

Assemblage of the computer as described above can be conducted relatively easily in a manner which lends itself to a robotic installation procedure. With reference to FIG. 2, it can be seen that the base 14 provides a vertically and rearwardly open space in which all of the components are to be assembled. FIG. 3 depicts the state of the computer after the speaker assembly 70, and main logic board assembly 60 and power supply assembly 50 have been installed. The speaker assembly 70 10 has been vertically lowered into the space. Observe that this installation can be performed by vertical downward movement of the speaker assembly since it is only necessary to slide the end plate 72 behind the hooks 74 (and possible also to insert a vertical post of the speaker assembly into the hole 75 of the base bottom wall 16).

The main logic board assembly 60, together with the fence plate 260 (FIG. 6), has been inserted horizontally forwardly through a space formed between the partial rear wall 24 and the side wall 20. The assembly 60 is supported by the tracks 40, 40' which accommodated the horizontal sliding movement.

FIG. 3 depicts the front sub-assembly 80 and the power supply assembly 197 in the process of being lowered into the base 14. The tabs 90, 92 of the front sub-chassis 80 are received in the slots 93, 95, respectively to constrain the sub-chassis 80 against horizontal and downward movement.

FIG. 4 depicts the CD assembly 126 and the hard drive 128 being inserted horizontally rearwardly into their respective bays 122, 124 of the front sub-chassis 80, as well as the floppy carrier 133 and the floppy drive 130 being installed downwardly. The CD assembly 126 and hard drive 128 slide horizontally along the tracks 150, 132, respectively. The floppy carrier 133 is slid rearwardly so that the two slots 138 thereof receive the horizontal portion 141 of the arm 141A and the leg 142, respectively. Then, the fingers 137 of the flanges 136 drop into the recesses 143, 144 of the front sub-chassis 80 to lock the floppy carrier 133 against horizontal movement.

The floppy drive 130 is then installed by causing the posts 139A carried by the floppy drive to enter the vertical holes 139 formed in the top of the floppy drives.

The IR/PB headphone board assembly 162 is installed by being slid horizontally rearwardly into the pocket 160 disposed adjacent one side of the hard drive 128 as shown in FIG. 5. Also, the locking bracket 170 is installed over the front of the hard drive 128 and secured by a screw fastener.

The rear sub-chassis 200 is installed vertically downwardly so that the tabs 244 thereof enter the vertical slots 247, 56 formed in the base side wall 20, and power supply assembly 50, respectively.

With reference to FIG. 5, the video output board 202, the TV tuner assembly 204, and the cooling fan assembly 206 can be installed either before or after the rear sub-chassis 200 is in place.

Thereafter, the top cover 300 is installed by downwardly onto the base 14 and then is slid horizontally rearwardly to engage the lugs 308 beneath the ears 320 of the base 14. The rear flange 340 of the top cover 300 is inserted between the flange 246 of the rear sub-chassis 200 and the ears 254 of the base 14, and screw fasteners are inserted through the aligned holes 250, 344 and 252. As a result, all of the internal components of the computer are effectively constrained against removal through the top and back of the base 14.

Finally, the decorative paneling 360, 380, 382, 400, and 420 is installed to the outside of the chassis as depicted in FIG. 8.

The resulting personal computer 10 constitutes a core computer which can be substantially reconfigured from a functional and/or aesthetic standpoint relatively easily. For making aesthetic changes, it is merely necessary to replace the aesthetic outer paneling with differently configured paneling. The replacement panels would, of course, carry the fingers 364.

A functional reconfiguring of the computer can be conveniently made without having to significantly disassemble the computer. Also, such functional reconfiguring can be made by moving the components in a horizontal direction (no vertical movement required). For example, by horizontally removing the front decorative panel 420 and the locking bracket 170, the CD assembly 126, the hard drive 128, and the floppy drive 130 can be slid horizontally forwardly from the housing. By horizontally removing the rear decorative panels 380, 382, it is possible to horizontally slide out the fence plate 260 and the logic board assembly 60 affixed thereto, as well as the TV tuner assembly 204 (through the hole 208 in the rear sub-chassis). When the logic board assembly 60 is removed, it will become unplugged from the connector 68.

If desired, a more substantial functional reconfiguring of the computer could be made by removing the top decorative panel 400 and top metal cover 300, thereby accessing the entire interior of the housing.

The present invention enables the appearance of a computer to be easily reconfigured by merely exchanging the decorative panels. Furthermore, in the event that a functional reconfiguring of the computer is required, that can also be accomplished quickly and easily.

Moreover, the assembling of the housing of the computer is greatly facilitated since the computer comprises a sheet-metal base chassis and separate sub-chassis which are merged in a vertical direction, and thus is readily adapted to robotic assemblage.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A computer comprising:

a housing including a plurality of metallic walls defining an enclosed chamber, two of said walls being removable to expose a top and a rear, respectively, of said chamber;

a circuit board disposed in said chamber and removable horizontally through said rear of said chamber when said rear is exposed;

a sub-chassis disposed in said chamber and being removable through said top of said chamber when said top is exposed, said sub-chassis including a pair of horizontally spaced connecting elements;

first and second horizontally spaced functional components removably secured to respective ones of said connecting elements; and a third functional component disposed beneath said sub-chassis and being removable through said top of said chamber when said top is exposed and said sub-chassis is removed.

2. The personal computer according to claim 1, further including an additional sub-chassis disposed in said chamber and removable vertically through said top of said chamber when said top is exposed; said additional sub-chassis including a plurality of horizontally spaced additional connecting elements; at least fourth and fifth functional components removably secured to respective ones of said additional connecting elements.

3. The personal computer according to claim 2, wherein said first and second functional components are disc drives; one of said fourth and fifth functional components being a cooling fan.

4. The personal computer according to claim 1, wherein said first and second functional components are disc drives.

5. The personal computer according to claim 4, wherein said third functional component is a speaker.

6. The personal computer according to claim 1, further including a power supply disposed within said chamber and removable vertically through said top of said chamber when said top is exposed.

7. The personal computer according to claim 1, wherein said side walls include bent portions forming vertical slots; said sub-chassis including downwardly projecting tabs receivable in respective ones of said slots.

8. The personal computer according to claim 1, further including an electrical connector removably mounted on a rear portion of said sub-chassis, a forward edge of said circuit board being horizontally plugged into said electrical connector.

9. The personal computer according to claim 1, wherein said walls include a front wall, a rear wall, two side walls, a bottom wall, and a top wall; and further including external panels removably mounted on at least said front wall, both of said side walls and said top wall.

* * * * *